United States Patent [19]

Sano

[11] Patent Number: 5,075,279
[45] Date of Patent: Dec. 24, 1991

[54] METHOD FOR THE MANUFACTURE OF MICROCAPSULES FOR PRESSURE-SENSITIVE RECORDING SHEETS

[75] Inventor: Shojiro Sano, Shizuoka, Japan

[73] Assignee: Fuji Photo Film Co., Ltd., Kanagawa, Japan

[21] Appl. No.: 366,394

[22] Filed: Jun. 15, 1989

[30] Foreign Application Priority Data

Jun. 15, 1988 [JP] Japan ................................ 63-147340

[51] Int. Cl.$^5$ ...................... B01J 13/16; B41M 5/165; G03C 1/12
[52] U.S. Cl. .................................. 503/215; 430/138; 264/4.7; 503/214; 503/221
[58] Field of Search ................. 264/4.7; 503/214, 215; 430/138

[56] References Cited

U.S. PATENT DOCUMENTS

| | | | |
|---|---|---|---|
| 3,577,515 | 5/1971 | Vandegaer et al. | 264/4.7 |
| 4,076,774 | 2/1978 | Short | 264/4.7 |
| 4,104,910 | 8/1978 | Ogata et al. | 73/862.53 |
| 4,230,743 | 10/1980 | Nakamura et al. | 503/216 X |
| 4,418,942 | 12/1983 | Hosoi et al. | 503/214 X |
| 4,529,681 | 7/1985 | Usami et al. | 430/338 X |
| 4,598,035 | 7/1986 | Usami et al. | 503/213 |
| 4,800,193 | 1/1989 | Saeki et al. | 503/217 |
| 4,803,192 | 2/1989 | Saeki et al. | 503/212 |
| 4,876,233 | 10/1989 | Saeki et al. | 503/215 X |

OTHER PUBLICATIONS

Kondo, A., *Microcapsule Processing and Technology*, Chap. 5, "Microencapsulation by Interfacial Polymerization" (Marcel Dekker, Inc., N.Y.), 1979.

*Primary Examiner*—Richard D. Lovering
*Assistant Examiner*—John M. Covert
*Attorney, Agent, or Firm*—Sughrue, Mion, Zinn, Macpeak & Seas

[57] ABSTRACT

A method for the manufacture of microcapsules for use in pressure-sensitive recording sheets is disclosed, which comprises after dispersing and emulsifying in a hydrophilic liquid a solution obtained by dissolving (a) a polyisocyanate, (b) an alkyleneoxide adduct of an amine and (c) an electron-donating color former in a hydrophobic liquid, adding a polyamine to the emulsified dispersion and forming microcapsules of poly(urethane urea) around the liquid droplets containing the color former.

18 Claims, No Drawings

METHOD FOR THE MANUFACTURE OF MICROCAPSULES FOR PRESSURE-SENSITIVE RECORDING SHEETS

FIELD OF THE INVENTION

This invention concerns microcapsules for pressure-sensitive recording sheets and, more precisely, it concerns a method for the manufacture of microcapsules for pressure-sensitive recording sheets in which use is made of a color forming reaction between a more or less colorless electron-donating dye and an electron-accepting compound.

BACKGROUND OF THE INVENTION

Pressure-sensitive recording sheets may consist of a combination of an upper sheet comprising a microcapsule layer, which contains microcapsules in which oil droplets obtained by dissolving a more or less colorless electron-donating dye (referred to hereinafter as a color former) in an appropriate solvent are microencapsulated, coated on a support, a lower sheet comprising a developing layer, which contains an electron-accepting compound (referred to hereinafter as a color developer), coated on another support and, depending on the particular case, intermediate sheets which have a microcapsule layer coated on one side of a support and a color developer coated on the other side of a support, or in some cases the aforementioned capsules and color developer are contained on the same side of a support, and in some other cases either the capsules or the color developer aforementioned is included in the support and the other is provided as a coating.

Such pressure-sensitive recording sheets have been disclosed, for example, in U.S. Pat. Nos. 2,505,470, 2,505,489, 2,550,471, 2,730,457, and 3,418,250. Known methods for the manufacture of the microcapsules used in pressure-sensitive recording sheets include, for example, coacervation methods, surface polymerization methods and in-situ polymerization methods. Coacervation methods have been disclosed, for example, in U.S. Pat. Nos. 2,800,457, 2,800,458 and 3,687,865, surface polymerization methods have been disclosed, for example, in U.S. Pat. Nos. 3,429,827, 3,577,515 and 3,886,085, and in-situ polymerization methods have been disclosed, for example, in U.S. Pat. Nos. 3,726,804 and 3,796,669.

Among these methods, microencapsulation by in situ polymerization and surface polymerization using the reaction between a polyisocyanate and water, a polyamine or a polyhydric alcohol has achieved some importance in recent years.

Microcapsules obtained using poly(urethane urea) films are advantageous in that it is possible to provide capsule solutions which have a higher concentration than those can be obtained by microencapsulation by coacervation with gelatin as widely used in the past, in that the resulting capsules have excellent water resistance, and in that encapsulation can be achieved in a short period of time.

However, the known microcapsules obtained using poly(urethane urea) films suffer from the following disadvantages.

1) They have inadequate resistance to solvents.

The oil droplets inevitably leak out from the capsules when in contact with organic solvents or when placed in an organic solvent atmosphere.

2) They have inadequate pressure resistance.

The capsules are ruptured on the application of low pressures, such as those imposed during print cutting and finishing, and fogging occurs.

3) The color formers react and a coloration is formed when isocyanates are used.

Aromatic based poly-isocyanates such as polymethylenepolyphenyl isocyanate form dark colors with fluoran compounds which have an —NH— group, such as 2-anilino-3-methyl-6-diethylaminofluoran, and this is undesirable in the case of microcapsules for use in pressure-sensitive recording sheets.

SUMMARY OF THE INVENTION

The aim of the present invention is to provide microcapsules for pressure-sensitive recording sheets which have excellent solvent resistance and pressure resistance, and little coloration, using poly(urethane urea) films.

The aim of the present invention has been realized by means of a method for the manufacture of microcapsules for use in pressure-sensitive recording sheets, which comprises after dispersing and emulsifying in a hydrophilic liquid a solution obtained by dissolving (a) a polyisocyanate, (b) an alkyleneoxide adduct of an amine and (c) an electron-donating color former in a hydrophobic liquid, to form an oil-in-water emulsion of emulsified hydrophobic liquid droplets containing the color former, adding a polyamine to the emulsified dispersion and forming microcapsules of poly(urethane urea) around the liquid droplets containing the color former.

DETAILED DESCRIPTION OF THE INVENTION

The polyisocyanates used in this invention are compounds which have two or more isocyanate groups. Actual examples of such compounds include 2,6-tolylenediisocyanate, 2,4-tolylenediisocyanate, naphthalene-1,5-diisocyanate, 4,4'-diphenylmethanediisocyanate, xylyene -1,4-diisocyanate, triphenylmethanetriisocyanate, hexamethylenediisocyanate, propylene-1,2-diisocyanate, butylene-1,2-diisocyanate, ethylidenediisocyanate, cyclohexylene-1,4-diisocyanate, isophoronediisocyanate, hexamethylenediisocyanate/trimethylolpropane adducts, hexamethylenediisocyanate/hexanetriol adducts, hexamethylenediisocyanate Biuret products, isocyanurates of hexamethylenediisocyanate, isocyanurates of isophoronediisocyanate, polymethylenepolyphenyl isocyanate, tolylenediisocyanate/trimethylolpropane adducts, xylylenediisocyanate/trimethylolpropane adducts, isocyanurates of tolylenediisocyanate, and tris(p-isocyanatophenyl)thiophosphate. Among these, polymethylenepolyphenyl isocyanate, tolylenediisocyanate/trimethylolpropane adducts and isocyanurates of tolylenediisocyanate are more preferred.

These polyisocyanates can be used individually or two or more may be used conjointly.

The use of at least one type of aromatic based polyisocyanate is desirable for providing capsules which have excellent color forming properties, solvent resistance and heat resistance.

The amine alkyleneoxide adducts used in the present invention are compounds in which at least one of the hydrogen atoms or the amino group of the amine has been replaced by an alkyleneoxide and which are soluble in hydrophobic liquids. Amines which can be used to form amine alkyleneoxide adducts included, for example, aliphatic amines containing 2 to 12 carbon atoms and having 2 to 8 amino groups, such as stearylamine, oleylamine, ethylenediamine, 1,3-propylenediamine, diethylenetriamine, triethylenetetramine, tetraethylenepentamine and 1,6-hexamethylenediamine, and aromatic amines containing 2 to 12 carbon atoms and having 2 to 8 amino groups, such as o-phenylenediamine, p-phenylenediamine and diaminonaphthalene.

The alkyleneoxide which is added to these amines may be, for example, ethyleneoxide, propyleneoxide, butyleneoxide or an α-olefin oxide having 2 to 8 carbon atoms. Of these, butyleneoxide is preferred from the point of view of solvent resistance.

The mol range of alkyleneoxide as the adduct is 4 to 50 mols per mol of amine.

The molecular weight of the amine alkyleneoxide adduct is preferably from 250 to 4,000. Two or more of these amine alkyleneoxide adducts can be used conjointly.

The amount of amine alkyleneoxide adduct used is from 1 to 100 wt %, and preferably from 2 to 50 wt %, with respect to the total amount of poly-isocyanate used.

It is possible by using the appropriate amount of amine alkyleneoxide adduct to improve the solvent resistance and pressure resistance of the capsules and, at the same time, to suppress to a low level the coloration which is formed by reaction between the color former and aromatic based polyisocyanates.

The polyamine which is used in the present invention is a compound which has two or more —NH— groups or —NH$_2$ groups in the molecule, and is soluble in hydrophilic liquids. The polyamine can be an aliphatic or aromatic amine containing 2 to 12 carbon atoms with up to 8 amino groups. Actual examples include ethylenediamine, diethylenetriamine, triethylenetetramine, tetraethylenepentamine, 1,3-propylenediamine, hexamethylenediamine, phenylenediamine, diaminonaphthalene and xylylenediamine, and these may be used individually, or combinations of two or more such compounds can be used.

The amount of polyamine used is from 0.5 to 100 wt %, and preferably from 2 to 50 wt %, with respect to the total weight of poly-isocyanate used.

It is possible, by using the appropriate amount of polyamine, to improve the solvent resistance of the capsules and, at the same time to suppress to a low level the coloration which is produced by reaction between the color former and aromatic based poly-isocyanates.

The polyamine can be added at any time after the solution obtained by dissolving the poly-isocyanate, the amine polyalkyleneoxide adduct and the color former in a hydrophobic liquid has been emulsified and dispersed in the hydrophilic solution.

Color formers which can be used in the invention include those used in this art, such as triphenylmethanephthalide based compounds, fluoran based compounds, phenothiazine based compounds, indolylphthalide based compounds, indolylazaphthalide based compounds, rhodamine lactam based compounds, triphenylmethane based compounds, triazine based compounds and spyropyran based compounds.

These color formers are used in the present invention in an amount of 0.05 to 0.25 g/m$^2$.

The fluoran compounds which have an —NH— group in the 2-position from among these color formers form dense colorations with aromatic polyisocyanates and so they cannot be used for microencapsulation using surface polymerization and in-situ polymerization methods in which use is made of poly(urethane urea) films obtained by reacting a polyisocyanate with water, polyamine or polyhydric alcohol as known in the past. However, there is virtually no color formation when fluoran compounds which have an —NH— group in the 2-position are used in microcapsules of this invention and so they can be used in this case.

Actual examples of fluoran compounds which have an —NH— group in the 2-position include 2-anilino-3-methyl-6-N-ethyl-N-isopentylaminofluoran, 2-anilino-3-methyl-6-dimethylaminofluoran, 2-anilino-3-methyl-6-N-ethylaminofluoran, 2-anilino-3-methyl-6-N-methyl-N-(isopropyl)aminofluoran, 2-anilino-3-methyl-6-N-methyl-N-pentylaminofluoran, 2-anilino-3-methyl-6-N-methyl-N-cyclohexylaminofluoran, 2-anilino-3-methyl-6-diethylaminofluoran, 2-anilino-3-chloro-6-dimethylaminofluoran, 2-anilino-3-methyl-6-N-ethyl-N-isoamylaminofluoran, 2-anilino-3-methyl-6-N-methyl-N-isoamylaminofluoran, 2-anilino-3-chloro-6-diethylaminofluoran, 2-anilino-3-chloro-6-N-methyl-N-ethylaminofluoran, 2-anilino-3-chloro-6-N-methyl-N-(isopropyl)aminofluoran, 2-anilino-3-chloro-6-N-methyl-N-cyclohexylaminofluoran, 2-anilino-3-chloro-6-N-methyl-N-pentylaminofluoran, 2-anilino-3-chloro-6-N-ethyl-N-pentylaminofluoran, 2 (p-methylanilino)-3-methyl-6-dimethylaminofluoran, 2-anilino-3-methyl-6-dibutylaminofluoran, 2-anlino-3-methyl-6-N-ethyl-N-isobutylaminofluoran, 2-anilino-6-dibutylaminofluoran, 2-anilino-3-methyl-6-N-methyl-N-tetrahydrofurfurylaminofluoran, 2-anilino-3-methyl-6-piperidinoaminofluoran, 2-(ochloroanilino)-6-diethylaminofluora n, 2-(3,4 -diethylaminofluoran and 2-(ofluoroanilino)-6-diethylaminofluoran.

Hydrophobic liquids used in the present invention include natural or synthetic oils. These oils may be used alone or in combination. Actual examples of hydrophobic liquids include cottonseed oil, coal oil, paraffin, naphtenic oil, alkylated biphenyl, alkylated terphenyl, chlorinated paraffin, alkylated naphthalene, diaryl alkane and dibasic acid esters such as phthalic acid ester.

Aqueous solutions of protective colloids and/or surfactants can be used as hydrophilic liquids. Hydrophilic polymeric substances such as gelatin, gum arabic, casein, carboxymethylcellulose, starch and poly(vinyl alcohol) are examples of protective colloids which can be used for this purpose. Examples of suitable surfactants include ionic surfactants such as alkylbenzenesulfonic acid, polyoxyethylenesulfates and turkey red oil, and non-ionic surfactants such as polyoxyethylene alkyl ethers, polyoxyethylenes and fatty acid esters of sorbitane.

The number average diameter of the microcapsules is preferably from 1 to 20 μm, and most desirably from 2 to 8 μm.

In order to produce the microcapsules in a short time, it is preferred that the emulsified dispersion is heated to at least 50° C., particularly at least 60° C.

A water soluble binder, latex based binder or a protective colloid, such as cellulose powder, starch powder or talc, for example, is normally added to the microcapsules obtained with the present invention to provide a microcapsule coating liquid for pressure-sensitive recording sheet purposes.

Examples of color developers which react with the color formers used in the recording sheets of this invention include clays, such as acid kaolin, active kaolin, attapulgite, zeolite, bentonite and kaolin, metal salts of aromatic carboxylic acids and phenolic resins.

These color developers are coated as is well known together with a binder, such as styrene/butadiene latex, onto a support such as paper, for example.

The microcapsule sheets for pressure-sensitive recording purposes of this invention were tested in respect of performance using a color developer sheet as described below. Unless otherwise indicated, all percents and parts are by weight.

PREPARATION OF THE COLOR DEVELOPER SHEET

Preparation of the Liquid Dispersion

Fifteen parts of zinc 3,5-di-α-methylbenzylsalicylate, 120 parts of calcium carbonate, 30 parts of active kaolin, 20 parts of zinc oxide, 1 part of sodium hexametaphosphoric acid, and 200 parts of water were dispersed uniformly to an average particle size of 3μm using a sand grinder to provide liquid dispersion (A).

Preparation of the Coating Liquid

Ten parts of an aqueous solution of 10% PVA-203 (made by KURARAY CO., LTD.), 100 parts of an aqueous solution of 10% PVA-117 (made by KURARAY CO., LTD.) and 10 parts (as solid fraction) of a carboxy modified SBR latex (SN-307, made by Sumitomo Nogatac Co., Ltd.) were added to 400 parts of liquid dispersion (A) and water was added to adjust the solid fraction concentration to 20% to provide a coating liquid.

Coating of the Color Developer Sheets

This coating liquid was coated onto 50 g/m$^2$ base paper using an air knife coater to provide a solid fraction coated weight of 5.0 g/m$^2$ and dried to provide color developer sheets.

The present invention is described in practical terms by means of examples below, but the invention is not limited by these examples.

ILLUSTRATIVE EXAMPLES

Example 1

Six grams of 2-anilino-3-methyl-6-N-ethyl-N -isopentylaminofluoran and 1.0 gram of 2-dibenzylamino-6-diethylaminofluoran as color formers were dissolved in 100 grams of 1-phenyl-1-xylylethane. Eight grams of polymethylenepolyphenyl isocyanate (trade name "Millionate MR200", made by the Nippon Polyurethane Co.) and 8 grams of the Biuret compound of hexamethylenediisocyanate (trade name "Sumidur N3200", made by the Sumitomo Bayer Urethane Co.) as polyisocyanates, and 3.2 grams of a butyleneoxide adduct of ethylenediamine (16.8 mol of butyleneoxide added per mol of ethylenediamine, mol. wt. 1267}as amine alkyleneoxide adduct were dissolved in the aforementioned oil solution to prepare a primary solution.

Next, 10 grams of poly(vinyl alcohol) and 5 grams of carboxymethylcellulose were dissolved in 140 grams of water to prepare a secondary solution. The above mentioned primary solution was then poured, with vigorous agitation, into the secondary solution and an oil in water type emulsion was formed. When the size of the oil droplets was 6.0 μm the rate of agitation was slackened and 100 grams of water at 20° C. and 1.6 grams of diethylenetriamine as a polyamine were added to the emulsion and, after stirring the mixture for 10 minutes at room temperature, the temperature of the system was gradually raised to 65° C. and maintained at this level for a period of 90 minutes.

Eighty grams of a 15% aqueous solution of poly(vinyl alcohol), 20 grams as solid fraction of carboxy modified SBR latex and 60 grams of starch powder (average particle size 15 μm) were added to the capsule liquid obtained in the way described above.

Water was then added to adjust the solid fraction concentration to 20% to prepare a coating liquid.

This coating liquid was coated onto a 40 g/m$^2$ base paper using an air knife coater so as to provide a dry coated weigh of 4 g/m$^2$ to provide a microcapsule sheet.

Example 2

A microcapsule sheet was obtained in the same way as in Example 1 except that 3.2 grams of the butyleneoxide adduct of diethylenetriamine (11.1 mol of butyleneoxide added per mol of diethylenetriamine, mol. wt. 900) was used as an amine alkyleneoxide adduct instead of the 3.2 grams of a butyleneoxide adduct of ethylenediamine (16.8 mol of butyleneoxide added per mol of ethylenediamine, mol. wt. 1,267) used in Example 1.

Example 3

A microcapsule sheet was obtained in the same way as in Example 1 except that 1.6 grams of tetraethylenepentamine was used as a polyamine instead of the 1.6 grams of diethylenetriamine used in Example 1.

COMPARATIVE EXAMPLE 1

A microcapsule sheet was obtained in the same way as in Example 1 except that no amine alkyleneoxide adduct was used.

COMPARATIVE EXAMPLE 2

A microcapsule sheet was obtained in the same way as in Example 1 except that no polyamine was used.

COMPARATIVE EXAMPLE 3

A microcapsule sheet was obtained in the same way as in Example 1 except that no amine alkyleneoxide adduct and no polyamine were used.

Example 4

Five grams of 2-anilino-3-methyl-6-diethylaminofluoran, 1.0 gram of benzoyl leucomethylene blue, and 2.0 grams of 3-[4-diethylamino-2-ethoxyphenyl]-3-(2-methyl-1-ethyl-3-indolyl)-4-azaphthalide, as color formers, were dissolved in 100 grams of diisopropylnaphthalene.

Ten grams of ethyl acetate was added to this oil solution, 16 grams of a tolylenediisocyanate (3 mol)/trimethylol propane (1 mol) adduct (trade name "Burnock D750", made by the Dainippon Ink and Chemicals, Inc.) as a polyisocyanate and 4.0 grams of a butyleneoxide adduct of ethylenediamine (12 mol of butyleneoxide added per mol of ethylenediamine, mol. wt. 924) as an amine alkyleneoxide adduct were added to this oil solution to prepare a primary solution.

Ten grams of poly(vinyl alcohol) and 2 grams of gum arabic were then dissolved in 140 grams of water to prepare a secondary solution. The above mentioned primary solution was poured into the secondary solution with vigorous agitation and an oil-in-water type emulsion was formed When the size of the oil droplets was 8.0 μm the rate of agitation was slackened and 100 grams of water at 20° C. and 0.6 grams of hexamethylenediamine as a polyamine were added to the emulsion and, after stirring the mixture for 10 minutes at room temperature, the temperature of the system was gradually raised to 80° C. and maintained at this level for a period of 90 minutes.

Eighty grams of a 15% aqueous solution of poly(vinyl alcohol), 20 grams as solid fraction of carboxy modified SBR latex and 60 grams of starch powder (average particle size 10 μm) were added to the capsule liquid obtained in the way described above.

Water was then added to adjust the solid fraction concentration to 20% to prepare a coating liquid.

This coating liquid was coated onto a 40 g/m² base paper using an air knife coater so as to provide a dry coated weight of 4 g/m² to provide a microcapsule sheet.

Example 5

A microcapsule sheet was obtained in the same way as in Example 4 except that 4.0 grams of a propyleneoxide adduct of ethylenediamine (4 mol of propyleneoxide added per mol of ethylenediamine, mol. wt. 292) was used as an amine alkyleneoxide adduct instead of the 4.0 grams of the butyleneoxide adduct of ethylenediamine (12 mol of butyleneoxide added per mol of ethylenediamine, mol. wt. 924) used in Example 4.

COMPARATIVE EXAMPLE 4

A microcapsule sheet was obtained in the same way as in Example 4 except that no amine alkyleneoxide adduct was used.

COMPARATIVE EXAMPLE 5

A microcapsule sheet was obtained in the same way as in Example 4 except that no polyamine was used.

COMPARATIVE EXAMPLE 6

A microcapsule sheet was obtained in the same way as in Example 4 except no amine alkyleneoxide adduct and no polyamine were used.

The microcapsule sheets described above were each combined with a color developer sheet and tested as pressure-sensitive recording sheets. The results of the tests are shown in Table 1. The methods used for evaluation in the tests were as indicated below.

(1) Color Forming Test

Each microcapsule sheet was laminated with a color developer sheet and color was formed by continuously striking with a lower-case letter "m" on a IBM model 6747 electronic typewriter. The samples were left to stand for 1 day after forming the coloration, after which the print density $D_{(typewriter)}$ in the visible region was measured using a Macbeth RD-918 model densitometer.

(2) Pressure Resistance Test

Each microcapsule sheet was laminated with a color developer sheet and a load of 10 kg/cm² was applied to produce pressure fogging on the surface of the developing sheet. The samples were aged under load for 3 days, after which the fog density D $_{(fog)}$ at 610 nm of the surface of the color developer sheet was measured using a Hitachi model 307 color analyzer.

(3) Solvent Resistance Test

Each microcapsule sheet was immersed in ethyl acetate for about 1 second and dried naturally, after which a color developer sheet was superimposed and a coloration was formed by applying a load of 600 kg/cm². Moreover, a coloration was obtained in the same way using a fresh sample which had not been subjected to the solvent treatment described above. The densities of the colors of these samples were measured in the visible region using a Macbeth model RD-918 densitometer and the ratio of the density of the solvent treated sample with respect to that of the fresh sample was obtained.

(4) Capsule Coloration Test

Five sheets of each microcapsule sheet sample were laminated together and the spectral absorption curves in the wavelength range from 550 to 700 nm of the capsule surfaces were measured and the peak absorption densities $D_{(capsule)}$ were obtained. The spectral absorption curves were measured using a Hitachi model 307 microanalyzer.

As shown in Table 1, the sheets in which microcapsules obtained using the method of the present invention were used had better pressure resistance and solvent resistance than the microcapsule sheets prepared for comparative purposes, and their performance was excellent with little coloration of the capsule surfaces.

While the invention had been described in detail and with reference to specific examples thereof, it will be apparent to one skilled in the art that various changes and modifications can be made therein without departing from the spirit and scope thereof.

TABLE 1

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| 1) | Color Forming Properties $D_{(typewriter)}$ | 0.45 | 0.44 | 0.44 | 0.47 | 0.46 | 0.45 | 0.44 | 0.45 | 0.47 | 0.46 | 0.46 |
| 2) | Pressure Resistance $D_{fog}$ | 0.078 | 0.075 | 0.076 | 0.083 | 0.085 | 0.120 | 0.078 | 0.115 | 0.132 | 0.082 | 0.129 |
| 3) | Solvent Resistance $D_{solvent\ treated}/D_{fresh} \times 100(\%)$ | 92 | 90 | 92 | 90 | 81 | 42 | 78 | 41 | 37 | 83 | 39 |
| 4) | Capsule Surface Coloration $D_{(capsule)}$ | 0.105 | 0.103 | 0.103 | 0.102 | 0.106 | 0.160 | 0.155 | 0.182 | 0.172 | 0.157 | 0.190 |

What is claimed is:

1. A method for the manufacture of microcapsules for use in pressure-sensitive recording sheets, which comprises dispersing and emulsifying in a hydrophilic liquid a solution obtained by dissolving (a) a polyisocyanate, (b) an alkyleneoxide adduct of an amine and (c) a fluoran compound which has an —NH— group in the 2-position as an electron-donating color former in a hydrophobic liquid, to form an oil-in-water emulsion of emulsified hydrophobic liquid droplets containing the color former, adding a polyamine to the emulsified dispersion and forming microcapsules of poly(urethane urea) around said liquid droplets containing the color former.

2. A method for the manufacture of microcapsules for use in pressure-sensitive recording sheets as in claim 1, wherein said electron-donating color former is a fluoran compound which is substituted with a secondary amino group.

3. A method for the manufacture of microcapsules for use in pressure-sensitive recording sheets as in claim 1, wherein the polyisocyanate is an aromatic based polyisocyanate.

4. A method of the manufacture of microcapsules for use in pressure-sensitive recording sheets as in claim 1, wherein the amine alkyleneoxide adduct is a compound in which at least one of the hydrogen atoms or the amino group of the amine has been replaced by an alkyleneoxide and which compound is soluble in hydrophobic liquids.

5. A method for the manufacture of microcapsules for use in pressure-sensitive recording sheets as in claim 4, wherein the amine used to form the amine alkyleneoxide adduct is an aliphatic or aromatic amine containing 2 to 12 carbon atoms and having from 2 to 8 amino groups.

6. A method for the manufacture of microcapsules for use in pressure-sensitive recording sheets as in claim 4, wherein the alkyleneoxide contains 2 to 8 carbon atoms.

7. A method for the manufacture of microcapsules for use in pressure-sensitive recording sheets as in claim 6, wherein the alkyleneoxide is butyleneoxide.

8. A method for the manufacture of microcapsules for use in pressure-sensitive recording sheets as in claim 1, wherein the molecular weight of the amine alkyleneoxide adduct is from 250 to 4,000.

9. A method for the manufacture of microcapsules for use in pressure-sensitive recording sheets as in claim 1, wherein the amount of the amine alkyleneoxide adduct is from 1 to 100 wt % with respect to the total amount of polyisocyanate used.

10. A method for the manufacture of microcapsules for use in pressure-sensitive recording sheets as in claim 9, wherein the amount of amine alkyleneoxide adduct is 2 to 50 wt % with respect to the total amount of polyisocyanate used.

11. A method for the manufacture of microcapsules for use in pressure-sensitive recording sheets as in claim 1, wherein the polyamine is a compound which has 2 or more —NH— groups or —NH$_2$ groups in its molecule and is soluble in hydrophilic liquids.

12. A method for the manufacture of microcapsules for use in pressure sensitive recording sheets as in claim 11, wherein the polyamine is used in an amount of from 0.5 to 100 wt % with respect to the total weight of polyisocyanate used.

13. A method for the manufacture of microcapsules for use in pressure-sensitive recording sheets as in claim 12, wherein the amount of polyamine used is from 2 to 50 wt % with respect to the total weight of polyisocyanate used.

14. A method for the manufacture of microcapsules for use in pressure-sensitive recording sheets as in claim 1, wherein the number average diameter of the microcapsules is from 1 to 20 μm.

15. A method for the manufacture of microcapsules for use in pressure-sensitive recording sheets as in claim 14, wherein the number average diameter of the microcapsules is from 2 to 8 μm.

16. A method for the manufacture of microcapsules for use in pressure-sensitive recording sheets as in claim 1, wherein the hydrophilic liquid comprises at least one of a protective colloid and surfactant.

17. A pressure-sensitive recording sheet comprising a support having coated thereon microcapsules prepared by the process of claim 1.

18. A method for the manufacture of microcapsules for use in pressure-sensitive recording sheets as in claim 1, wherein the fluoran compound is selected from the group consisting of 2-anilino-3-methyl-6-N-ethyl-N -isopentylaminofluoran, 2-anilino-3-methyl-6-dimethylaminofluoran, 2-anilino-3-methyl-6-N -ethylaminofluoran, 2-anilino-3-methyl-6-N-methyl-N -(isopropyl)aminofluoran, 2-anilino-3-methyl-6-N-methyl-N -pentylaminofluoran, 2-anilino-3-methyl-6-N-methyl-N -cyclohexylaminofluoran, 2-anilino-3-methyl-6-diethylaminofluoran, 2-anilino-3-chloro-6-dimethylaminofluoran, 2-anilino-3-methyl-6-N-ethyl-N -isoamylaminofluoran, 2-anilino-3-methyl-6-N-methyl-N -isoamylaminofluoran, 2-anilino-3-chloro-6-diethylaminofluoran, 2-anilino-3-chloro-6-N-methyl-N -ethylaminofluoran, 2-anilino-3-chloro-6-N-methyl-N -(isopropyl)aminofluoran, 2-anilino-3-chloro-6-N-methyl-N -cyclohexylaminofluoran, 2-anilino-3-chloro-6-N-methyl-N -pentylaminofluoran, 2-anilino-3-chloro-6-N-ethyl-N -pentylaminofluoran, 2-(p-methylanilino)-3-methyl-6-dimethylaminofluoran, 2-anilino-3-methyl-6-dibutylaminofluoran, 2-anilino-3-methyl-6-N-ethyl-N -isobutylaminofluoran, 2-anilino-6-dibutylaminofluoran, 2-anilino-3-methyl-6-N-methyl-N-tetrahydrofurfurylaminofluoran, 2-anilino-3-methyl-6-piperidinoaminofluoran, 2-(ochloroanilino)-6-diethylaminofluoran, 2-(3,4-dichloroanilino)-6-diethylaminofluoran and 2-(ofluoroanilino)-6-diethylaminofluoran.

* * * * *